Patented May 24, 1949

2,471,023

UNITED STATES PATENT OFFICE 2,471,023

HIGHLY POLYMERIC LINEAR ESTERS

James Gordon Cook, James Tennant Dickson, and Arthur Reginald Lowe, Blackley, Manchester, and John Rex Whinfield, Accrington, England, assignors to Imperial Chemical Industries Limited, a corporation of Great Britain No Drawing. Application November 21, 1946, Serial No. 711,470. In Great Britain December 11, 1945

5 Claims. (Cl. 260—78.3)

This invention relates to the manufacture of new highly polymeric linear esters and to the production of filaments, fibres and the like therefrom.

We have now found that synthetic linear polyesters capable of being drawn into pliable, strong fibres showing by characteristic X-ray patterns orientation along the fibre axis, having high melting points and being well adapted for use in the textile field may be manufactured from certain hydroxycarboxylic acids or ester-forming derivatives thereof.

According to the present invention we provide a process for the manufacture of highly polymeric linear esters which comprises heating a hydroxycarboxylic acid of the general formula

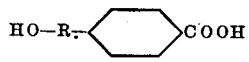

or an ester-forming derivative thereof, wherein R is one of the groups of the general formulae $(CH_2)_x$ and $(CH_2)_z-O$, wherein $x$ is an integer not exceeding 2 and $z$ is an integer greater than 1 but not exceeding 3, or a low molecular weight product obtainable from said acid or ester-forming derivative thereof, the heating being effected under conditions whereby, at least during the later stages of the reaction, volatile by-products are removed and being continued until filaments formed from a melt of the product can be permanently extended by cold-drawing into useful fibres.

Hydroxycarboxylic acids of the hereinbefore given general formula which may be used for the purposes of this invention include p-(β-hydroxyethoxy)-benzoic acid, p-(hydroxymethyl)-benzoic acid, p-(β-hydroxyethyl)-benzoic acid and p-(γ-hydroxypropoxy)-benzoic acid.

Ester-forming derivatives of the acids include esters such as low alkyl esters, cycloalkyl esters and aryl esters, acid halides or ammonium or amine salts. The esters may be formed with the carboxylic substituent from lower alkyl alcohols, for example, methyl, ethyl, propyl, amyl, hexyl or heptyl alcohols, or from phenols or its homologues. Esters may also be formed with the hydroxylic substituent by means of a lower fatty acid, for example, acetic acid.

Alternatively, esters with polyhydric alcohols, preferably with glycols, may be formed from the carboxylic substituent of the hydroxycarboxylic acid, and these esters may likewise be used to get the new polyesters of the present invention. For instance, the methyl ester of p-(hydroxymethyl)-benzoic acid may be converted to the β-hydroxyethyl ester by heating with ethylene glycol, and this ester may then be converted into a highly polymeric linear ester according to the process of the present invention by heating under vacuum.

The heating of the hydroxycarboxylic acids themselves results, in the first place, in the formation of a low molecular weight linear polyester therefrom, by the interaction of the complementary hydroxylic and carboxylic substituents. When an ester of the hydroxycarboxylic acid is used, the heating causes, in the first place, an ester-interchange and the formation also of a low molecular weight linear polyester therefrom. Similarly, in the first place, low molecular weight linear polyesters are formed from the halides or ammonium or amine salts of the hydroxycarboxylic acids, with the liberation of, respectively, hydrogen chloride, ammonia or the amine. The heating is usually above the melting point of the reaction mass, and under conditions such that water and any other volatile by-products are removed from the reaction zone, in the case of by-products comprising alcohols or phenols, usually by means of conventional distillation equipment.

When using esters, an ester interchange catalyst or a mixture of such catalysts can be used to facilitate the reaction. These include, for instance, lithium, sodium, potassium, calcium, beryllium, magnesium, zinc, cadmium, aluminium, chromium, molybdenum, manganese, iron, cobalt, nickel, copper, silver, mercury, tin, lead, bismuth, antimony, platinum and palladium. Suitable proportions are from 0.025% to 0.1% on the weight of the ester. The ester interchange catalysts may be added as such, in the form of powder, chips, shavings, ribbon, wire or in any other convenient form. The alkali metals, the alkaline earth metals or magnesium are conveniently used in the form of alcoholates, formed by dissolving them in a monohydric alcohol such as methyl or ethyl alcohol. The alkali metals may also be used in the form of their carbonates or other alkaline reacting salts, for example, borates. Magnesium may be used in the form of its oxide.

Continued heating of the products formed in the initial stages of the reaction, that is, the low molecular weight linear polyesters brings about their conversion into high molecular weight fibre-forming products. Advantageously, during this stage of the heating or during part of it the pressure is reduced so as to facilitate the more rapid removal of the water or other volatile by-products. Pressures of from 20 mm. down to 0.1 mm. of mercury are particularly suitable but higher or lower pressures may be used if desired. Ester interchange catalysts may be present during this stage of the heating.

The heating for the purposes of this invention is advantageously effected in the absence of oxygen and, preferably, with a stream of an oxygen-free gas, for example, nitrogen, passing through and/or over the reaction mass. If desired, the reaction mass may be agitated mechanically during the heating.

The desirable requirements for satisfactory production of the high molecular weight fibre-forming linear esters are the removal of volatile materials as completely as possible and the continuance of the heating until a satisfactory fibre-forming capability is attained, that is to say, until the reaction product can be formed from the melt into filaments which can be permanently extended by cold-drawing into pliable strong fibres.

Measurement of intrinsic viscosity of the polyesters provides an alternative method of determining the attainment of a satisfactory fibre-forming capability. Thus, the term "high molecular weight fibre-forming" may be taken to mean that state of the polyester which has an intrinsic viscosity of 0.3 to 1.5, as determined in metacresol by the standard extrapolation to zero concentration according to the method of Kraemer and which is capable of being drawn into pliable, strong fibres.

After the heating is completed, the product may be extruded or otherwise removed in molten form from the vessel in which it has been formed and subsequently cooled. The extruded polymer may be formed into blocks, chips or other shapes.

The highly polymeric linear polyesters made according to the process of this invention find their greatest utility in the art in the form of filaments or fibres. Filaments can be formed by extrusion or by drawing from the melt directly after the completion of the heating or after re-melting. Any suitable apparatus may be used. The filaments can be cold-drawn to as much as several times their original lengths. The cold-drawing operation may be carried out on filaments which have been allowed fully to cool and solidify after their formation, or it may directly follow the formation of the filaments as one part of a continuous process. Any suitable apparatus and process may be used for the cold-drawing. For instance, the filaments may be wound from one roller to another, the second roller rotating at a higher speed than the first roller, for example at a speed up to about 4 or 5 times that of the first roller. Alternatively, the cold-drawing may be effected by employing a snubbing pin.

The term cold-drawing, as used herein, includes warming the filaments to facilitate stretching, for instance, by passing them through warm or hot water or steam before and/or during the cold-drawing operation.

The new polyesters of the present invention are highly polymeric linear esters with recurring structural units of the general formula

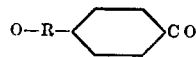

wherein R is one of the groups of the general formulae $(CH_2)_x$ and $(CH_2)_z-O$, wherein $x$ is an integer not exceeding 2 and $z$ is an integer greater than 1 but not exceeding 3.

In addition to the capability of being formed into molecularly oriented structures of great strength and pliability and of high melting points, the new highly polymeric esters of this invention have a low moisture regain, a low solubility in solvents, and a good resistance to hydrolysis by acids or alkalis.

In addition to outstanding utility in the art in the form of filaments and fibres the highly polymeric linear polyesters of the present invention may be formed from the melt into other shaped articles, for example, films or mouldings, or they may be used for hot melt coatings or as adhesives, plasticizers, binders for coating compositions or bonding materials for laminated fabrics, for example, in doubled fabric collars.

The invention is illustrated but not limited by the following examples, in which the parts are expressed by weight:

*Example 1* p-(β-Hydroxyethoxy)-benzoic acid is heated at 200° C. in a vessel fitted with a vapour off-take and a gas inlet by means of which a stream of oxygen-free nitrogen is bubbled through the molten mass. After 1 hour temperature is raised to 250° C. and maintained for a further 1 hour. The pressure is then reduced to 0.3 mm. of mercury, and the heating is continued at this temperature for 5 hours. At this stage the melt can be formed into filaments which can be drawn out into fibres. The product is extruded from the vessel and cooled. The product is a crystalline solid with a melting point of 200-210° C.

The acid used in this example is obtained by boiling the sodium salt of ethyl p-hydroxybenzoate with ethylene chlorhydrin in ethyl alcohol and hydrolysing the resulting ester.

*Example 2* p-(Hydroxymethyl)-benzoic acid is heated under the conditions described in Example 1, the heating schedule being 4 hours at 200° C. at atmospheric pressure, 1½ hours at 287° C. at atmospheric pressure, and 9½ hours at 287° C. at a pressure of 3 mm. of mercury. At this stage the melt can be formed into filaments which can be drawn out into fibres. The product is removed from the vessel and cooled. The product is crystalline and has a melting point of 205-210° C.

*Example 3* p-(β-Hydroxyethyl)-benzoic acid is heated at 200° C. in a vessel fitted with a vapour off-take and a gas inlet by means of which a stream of oxygen-free nitrogen is bubbled through the molten mass. After 1 hour the temperature is raised to 250° C. and maintained for a further hour. The temperature is then raised to 340° C., the pressure is reduced to 0.3 mm. of mercury, and the heating is continued for a further hour. At this stage the melt can be formed into filaments which can be drawn out into fibres. The product is extruded from the vessel and cooled and the product is a crystalline solid with a melting point of 180-185° C.

The acid used in this example is made by aqueous hydrolysis of p-β-bromoethylbenzoic acid, which in turn is made from β-phenylethyl alcohol by hydrobromination, condensation with acetyl chloride, and finally oxidation.

*Example 4* p-(γ-Hydroxypropoxy)-benzoic acid is heated under the conditions described in Example 1, the heating schedule being 2 hours at 198° C. at atmospheric pressure, 2¾ hours at 258° C. at atomspheric pressure, 6½ hours at 258° C. at a pressure of 0.1 mm. of mercury and finally 1 hour at 284° C. at a pressure of 0.4 mm. of mercury. At this stage the melt can be formed into filaments which, especially after super-cooling, can be drawn out into fibres. The product is extruded from the vessel and cooled and is a crystalline solid with a melting point of 180–185° C.

The acid used in this example is made by condensing trimethylene chlorhydrin with the methyl ester of p-hydroxybenzoic acid in the presence of sodium ethoxide, and hydrolysing the resulting ester; it melts at 152–154° C.

The new products described in the foregoing examples may be spun from the melt into fibres and thereafter cold-drawn by as much as several times their original lengths.

We claim:

1. A process for the manufacture of highly polymeric linear esters which comprises heating a compound from the group consisting of (1) acids of the general formula

wherein R is a divalent radical from the group consisting of $(CH_2)_x$ and $(CH_2)_z$—O wherein $x$ is an integer not exceeding two and $z$ is an integer greater than 1 but not exceeding 3, (2) ester forming derivatives of said acids, and (3) low molecular weight polymers obtained by heating said acids, the heating of said compound being effected under conditions whereby, at least during the later stages of the reaction, volatile by-products are removed, and being continued until filaments formed from a melt of the product can be permanently extended by cold-drawing into useful fibres.

2. A process as claimed in claim 1 wherein the heating is effected in a stream of an oxygen-free gas.

3. Highly polymeric linear hydroxy carboxylic acid esters comprised essentially of recurring structural units of the general formula

wherein R is a divalent radical from the group consisting of $(CH_2)_x$ and $(CH_2)_z$—O, wherein $x$ is an integer not exceeding 2 and $z$ is an integer greater than 1 but not exceeding 3.

4. A process for the manufacture of highly polymeric linear esters which comprises heating the β-hydroxyethyl ester of p-(hydroxymethyl)-benzoic acid, the heating being effected under conditions whereby, at least during the later stages of the reaction, volatile by-products are removed, and being continued until filaments formed from a melt of the product can be permanently extended by cold-drawing into useful fibres.

5. The highly polymeric linear esters of claim 3 in the form of cold-drawn fibres.

JAMES GORDON COOK.
JAMES TENNANT DICKSON.
ARTHUR REGINALD LOWE.
JOHN REX WHINFIELD.

REFERENCES CITED

The following references are of record in the file of this patent:

UNITED STATES PATENTS

| Number | Name | Date |
|---|---|---|
| 2,071,250 | Carothers | Feb. 16, 1937 |